United States Patent
Khanka et al.

(10) Patent No.: US 8,055,295 B1
(45) Date of Patent: Nov. 8, 2011

(54) LOAD-BASED SELECTION OF A FREQUENCY BAND CLASS FOR A WIRELESS COMMUNICATION DEVICE

(75) Inventors: Bhagwan Singh Khanka, Lenexa, KS (US); Anoop Kumar Goyal, Overland Park, KS (US); Hemanth Balaji Pawar, Herndon, VA (US); Shilpa Kowdley Srinivas, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 447 days.

(21) Appl. No.: 12/367,348

(22) Filed: Feb. 6, 2009

(51) Int. Cl.
*H04M 1/00* (2006.01)

(52) U.S. Cl. ...................... 455/552.1; 455/103

(58) Field of Classification Search ............... 455/552.1, 455/553.1, 102, 513
See application file for complete search history.

(56) References Cited

U.S. PATENT DOCUMENTS

| | | | |
|---|---|---|---|
| 6,011,960 A * | 1/2000 | Yamada et al. | 455/77 |
| 6,069,871 A | 5/2000 | Sharm et al. | |
| 7,430,420 B2 * | 9/2008 | Derakhshan et al. | 455/452.2 |
| 7,596,378 B1 * | 9/2009 | Nizri et al. | 455/448 |
| 2005/0070280 A1 | 3/2005 | Jung et al. | |
| 2009/0047984 A1 * | 2/2009 | Gollamudi et al. | 455/513 |

* cited by examiner

*Primary Examiner* — James H Cho

(57) ABSTRACT

A wireless communication system provides a wireless communication service over a first frequency band class and a second frequency band class. The system monitors first and second communication loads on the first and second frequency band classes. The system receives a request for the communication service from a wireless communication device, and in response, determines if the wireless communication device can receive the wireless communication service over either one of the frequency band classes. If the wireless communication device can receive the wireless communication service over either one of the frequency band classes, then the system selects one of the frequency band classes based on the first and second communication loads. The system provides the wireless communication service to the wireless communication device over the selected frequency band class.

20 Claims, 6 Drawing Sheets

LOAD-BASED SELECTION OF A FREQUENCY BAND CLASS FOR A WIRELESS COMMUNICATION DEVICE

TECHNICAL BACKGROUND

Wireless communication devices and base stations wirelessly communicate over frequency band classes. A frequency band class is a section of the frequency spectrum that is individually licensed by the Federal Communication Commission (FCC). In the past, wireless communication devices typically operated over a single frequency band class. At present, wireless communication devices are becoming available that can operate over multiple frequency band classes.

The wireless communication devices exchange signaling with base stations to obtain wireless communication services, such as telephony and Internet access. These wireless communication devices may be in active mode where the signaling is continuously exchanged, or the devices may be in idle mode where they are substantially dormant—only waking up periodically to briefly exchange signaling.

OVERVIEW

A wireless communication system provides a wireless communication service over a first frequency band class and a second frequency band class. The system monitors first and second communication loads on the first and second frequency band classes. The system receives a request for the communication service from a wireless communication device, and in response, determines if the wireless communication device can receive the wireless communication service over either one of the frequency band classes. If the wireless communication device can receive the wireless communication service over either one of the frequency band classes, then the system selects one of the frequency band classes based on the first and second communication loads. The system provides the wireless communication service to the wireless communication device over the selected frequency band class.

In some examples, the communication loads include the amount of idle mode users and the amount of active mode users in each frequency band class. The frequency band class is selected for the communication device based the amounts of idle mode users and active mode users in each of the frequency band classes.

DETAILED DESCRIPTION

Figure 1:
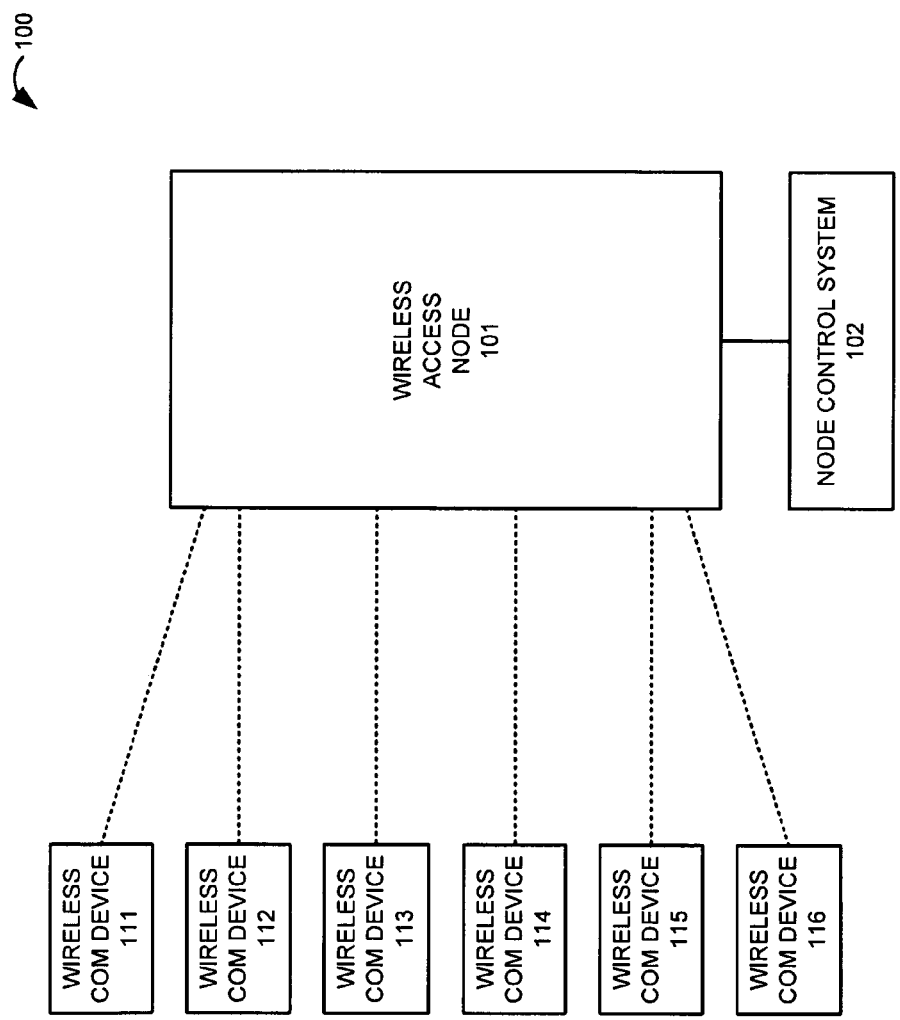
FIG. 1 illustrates a wireless communication system.

FIG. 1 illustrates wireless communication system 100. Wireless communication system 100 includes wireless access node 101, node control system 102, and wireless communication devices 111-116. Wireless access node 101 and wireless communication devices 111-116 communicate over wireless communicate links. Wireless access node 101 and node control system 102 communicate over a direct communication link or through some combination of communication networks, systems, and links.

Wireless access node 101 comprises base stations, antennas, transceivers, amplifiers, filters, routers, servers, communication links, or some other communication components—including combinations thereof. Node control system 102 comprises software, memory, processing circuitry, and a communication interface. Node control system 102 may reside in a single device or may be distributed across multiple devices. Node control system 102 is shown externally to wireless access node 101, but node control system 102 could be integrated within the components of wireless access node 101.

Wireless communication devices 111-116 comprise telephones, RF transceivers, computers, digital assistants, Internet access devices, or some other wireless communication apparatus—including combinations thereof. The wireless communication links between wireless communication devices 111-116 and wireless access node 101 use the air or space as the transport media. These wireless communication links may use various protocols, such as wireless fidelity, code division multiple access, global system for mobile communications, worldwide interoperability for microwave access, long term evolution, internet, telephony, or some other communication format—including combinations thereof.

The communication link between wireless access node 101 and node control system 102 (if any) uses metal, glass, air, space, or some other material as the transport media. This communication link could use various protocols, such as wireless fidelity, code division multiple access, global system for mobile communications worldwide interoperability for microwave access, internet, Ethernet, telephony, time division multiplex, or some other communication format—including combinations thereof.

Wireless access node 101 and wireless communication devices 111-116 are capable of implementing a wireless communication service using multiple frequency band classes. In this example, wireless communication devices 111-112 currently use a first frequency band class, and wireless communication devices 113-115 currently use a second frequency band class. A frequency band class is a portion of the RF spectrum that is individually licensed by the Federal Communication Commission (FCC). For example, a first frequency band class could be Wireless Fidelity and a second frequency band class could be Evolution Data Only. In another example, the first frequency band class could be FCC band class 1 and the second frequency band class could be FCC band class 14. Node control system 102 selects the frequency band class for each of wireless communication devices 111-116 based on the communication loading of the frequency band classes.

In this example, wireless communication devices 111-113 are currently in active mode, and wireless communication devices 114-115 are currently in idle mode. In active mode, wireless communication devices 111-113 have continuously active signaling channels with wireless access node 101, and may use those channels to request or accept wireless communications, such as voice calls, Internet access, video delivery, and the like. In idle mode, wireless communication devices 114-115 do not have continuously active signaling channels. In idle mode, wireless communication devices 114-115 are dormant for a set period of time before activating temporary signaling channels to briefly exchange information with wireless access node 101 (while remaining in idle mode), and then devices 114-115 return to dormant status for the set period of time. In idle mode, wireless communication devices 114-115 may also use the temporarily active signaling channels to request a transition to active mode.

Figure 2:
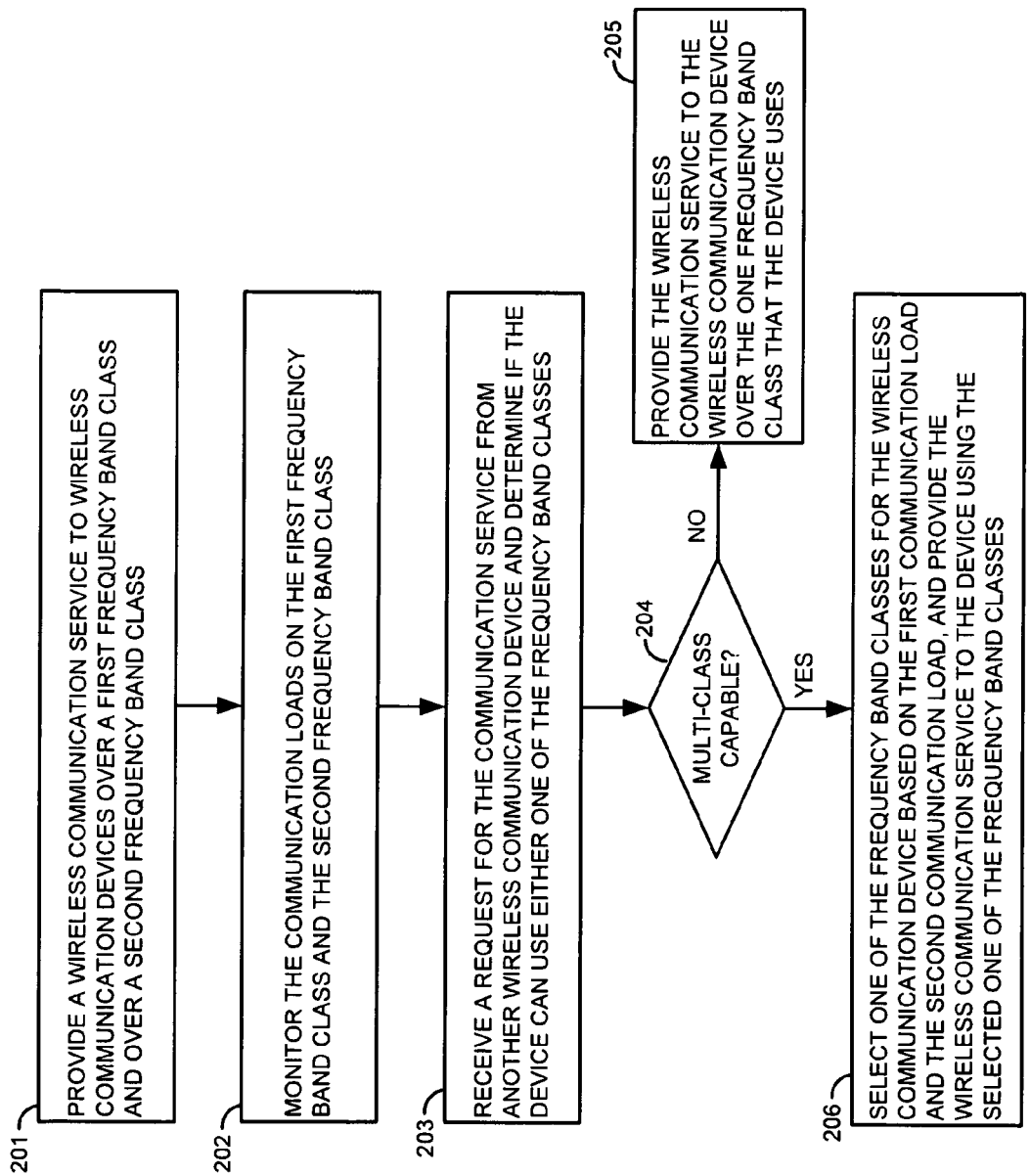
FIG. 2 illustrates the operation of the wireless communication system.

FIG. 2 illustrates the operation of wireless communication system 100. Wireless access node 101 provides a wireless communication service to wireless communication devices 111-115 over the first frequency band class and over the second frequency band class (201). The wireless communication service comprises wireless access to other communication devices, communication networks, data systems, and/or media content. Wireless access node 101 monitors a first communication load on the first frequency band class and a second communication load on the second frequency band class (202). The first and second communication loads may comprise amounts of users, active mode users, idle mode users, noise, bandwidth, power, or some other loading metrics for the frequency band classes.

Wireless access node 101 receives a request for the communication service from wireless communication device 116 (203). Node control system 102 determines if wireless communication device 116 is capable of receiving the wireless communication service over either one of the frequency band classes (203). This determination could be accomplished through a database look-up for device 116 or through information provided by device 116 along with the request. If wireless communication device 116 can only receive the wireless communication service over one of the frequency band classes (204), then wireless access node 101 provides the wireless communication service to wireless communication device 116 over the one frequency band class that device 116 uses (205).

If wireless communication device 116 can receive the wireless communication service over either one of the frequency band classes (204), then node control system 102 selects one of the frequency band classes for the wireless communication device based on the first communication load and the second communication load (206). Wireless access node 101 provides the wireless communication service to wireless communication device 116 over the selected one of the frequency band classes (206). The frequency band class selection could be implemented by transferring band class instructions to wireless access node 101 and wireless communication device 116. Node control system 102 may also verify that wireless communication device 116 has sufficient wireless coverage in the selected frequency band class before implementing the selection.

Thus, node control system 102 effectively performs load-based selection of frequency band classes for multi-class capable devices. Typically, wireless communication devices are allocated to the frequency band class with the lower communication load. For example, node control system 102 may select the frequency band class for device 116 that currently has the fewest number of active mode users. In that scenario, node control system 102 would select the second frequency band class for device 116, since the second frequency band class has only one active mode user (device 113), and the first frequency band class has two active mode users (devices 111-112). Note that in this example, the selected second frequency band class actually has more total users (devices 113-115) than the first frequency band class (devices 111-112), but the selected second frequency band class has fewer active mode users (device 113) than the first frequency band class (devices 111-112). In another example, node control system 102 may select the frequency band class for device 116 that currently has the highest number of idle mode users. In that scenario, node control system 102 would select the second frequency band class for device 116, since the second frequency band class has two idle mode users (devices 114-115), and the first frequency band class has no idle mode users. Other load-based selection techniques could be used.

In addition, node control system 102 may also consider the quality-of-service level for device 116 when making the selection. For example, node control system 101 may only perform the load-based selection of frequency band classes for devices with high quality-of-service levels. Other devices with low quality-of-service levels may have to perform the selection on their own or be randomly assigned. In another example where the first frequency band class becomes overloaded, only devices with high quality-of-service levels may be selected for the second and more lightly loaded frequency band class.

Figure 3:
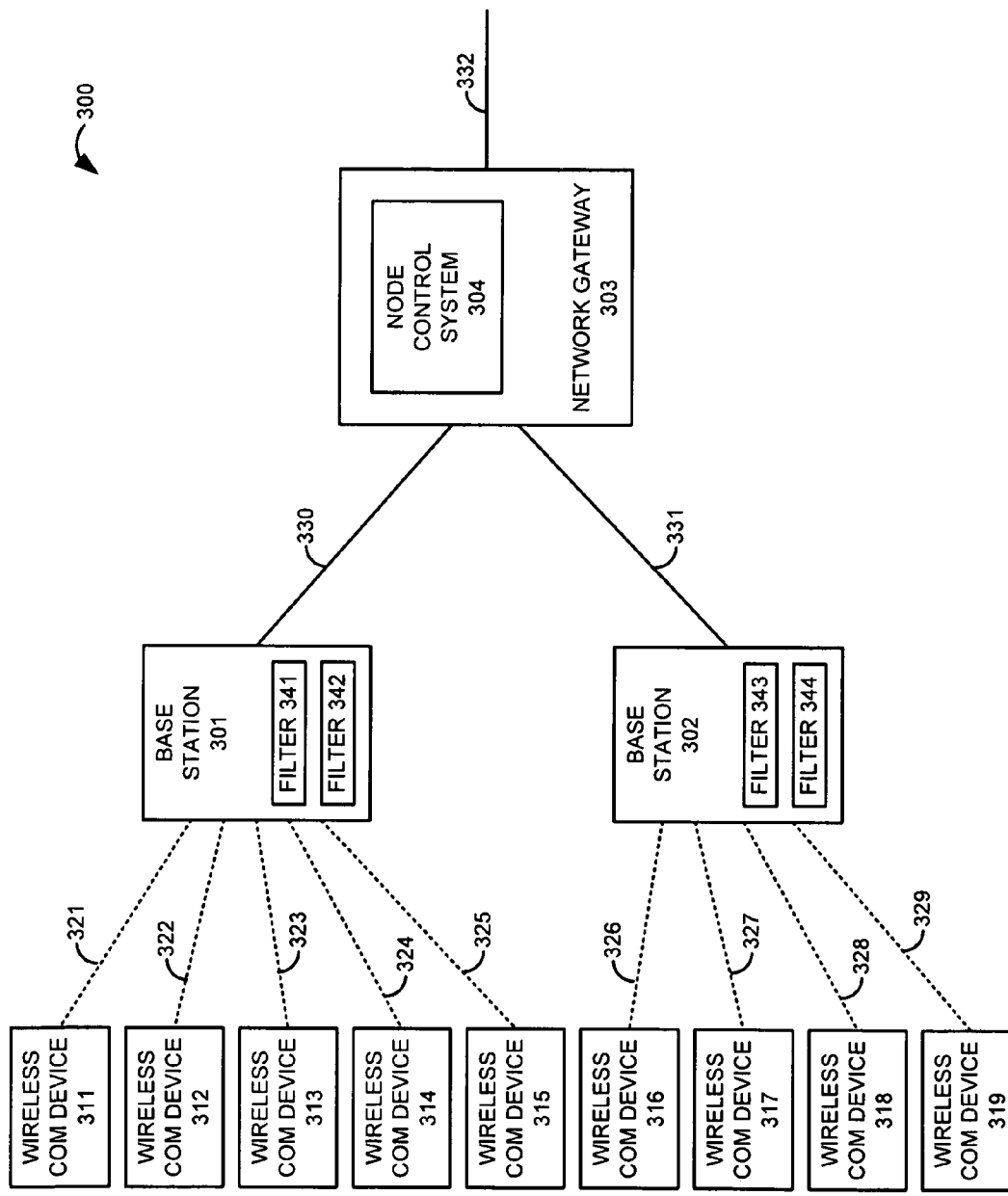
FIG. 3 illustrates a wireless communication system.

FIG. 3 illustrates wireless communication system 300. Wireless communication system 300 comprises base stations 301-302, network gateway 303, wireless communication devices 311-319, and communication links 321-332. Network gateway 303 includes node control system 304. Base station 301 includes filters 341-342, and base station 302 includes filters 343-344. Filters 341 and 343 are bandpass filters that pass signals in a first FCC frequency band class and block signals in other frequency bands. Filters 342 and 344 are bandpass filters that pass signals in a second FCC frequency band class and block signals in other frequency bands. The first FCC band class and the second FCC band class are mutually exclusive from a frequency perspective. Base stations 301-302 and wireless communication devices 311-319 wirelessly communicate over communication links 321-329. Network gateway 303 and base stations 301-302 communicate over communication links 330-331. Network gateway 303 communicates with data communication systems (not shown) over communication links 332.

Figure 4:
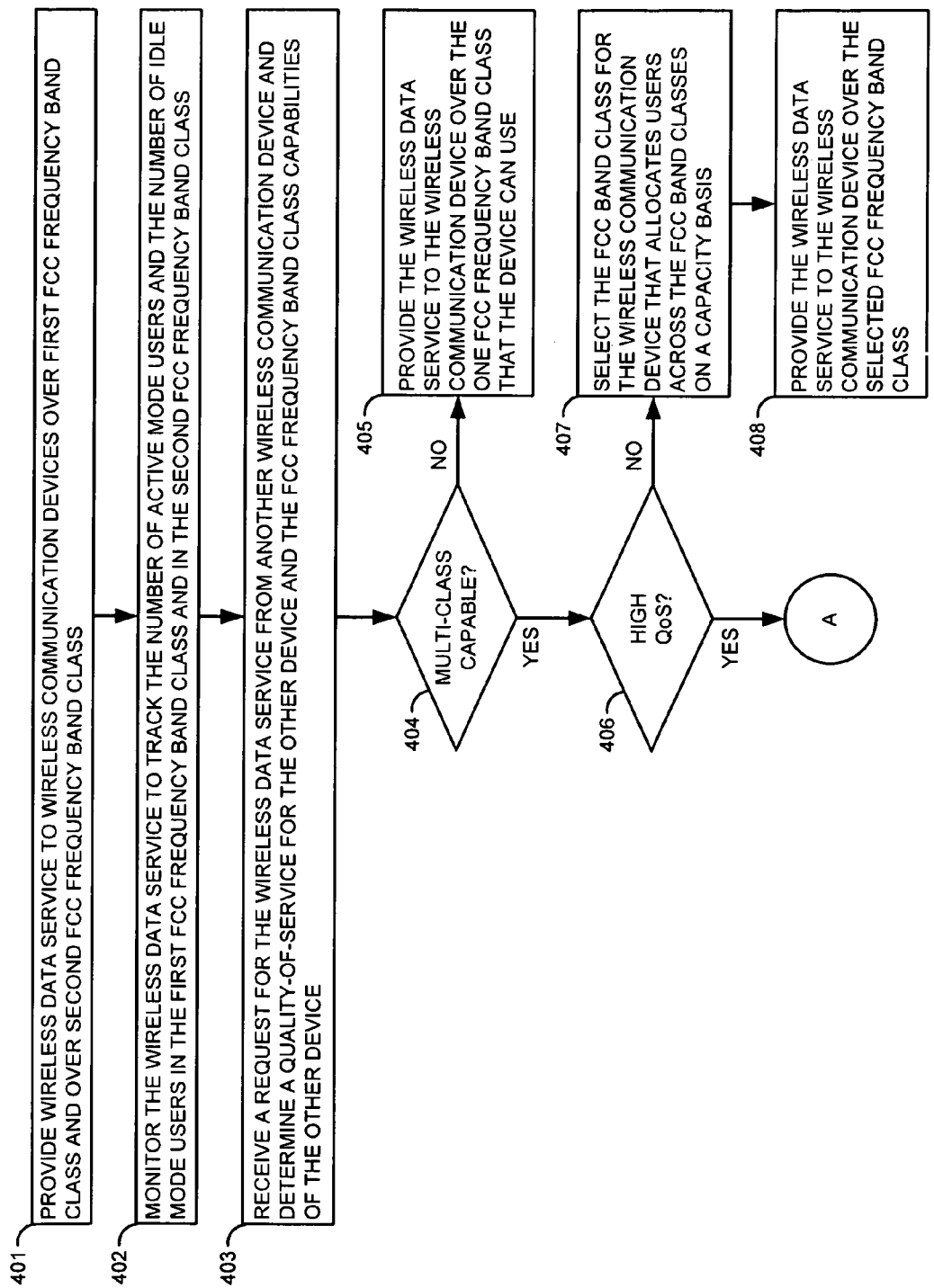
FIG. 4 illustrates the operation of the wireless communication system.
Figure 5:
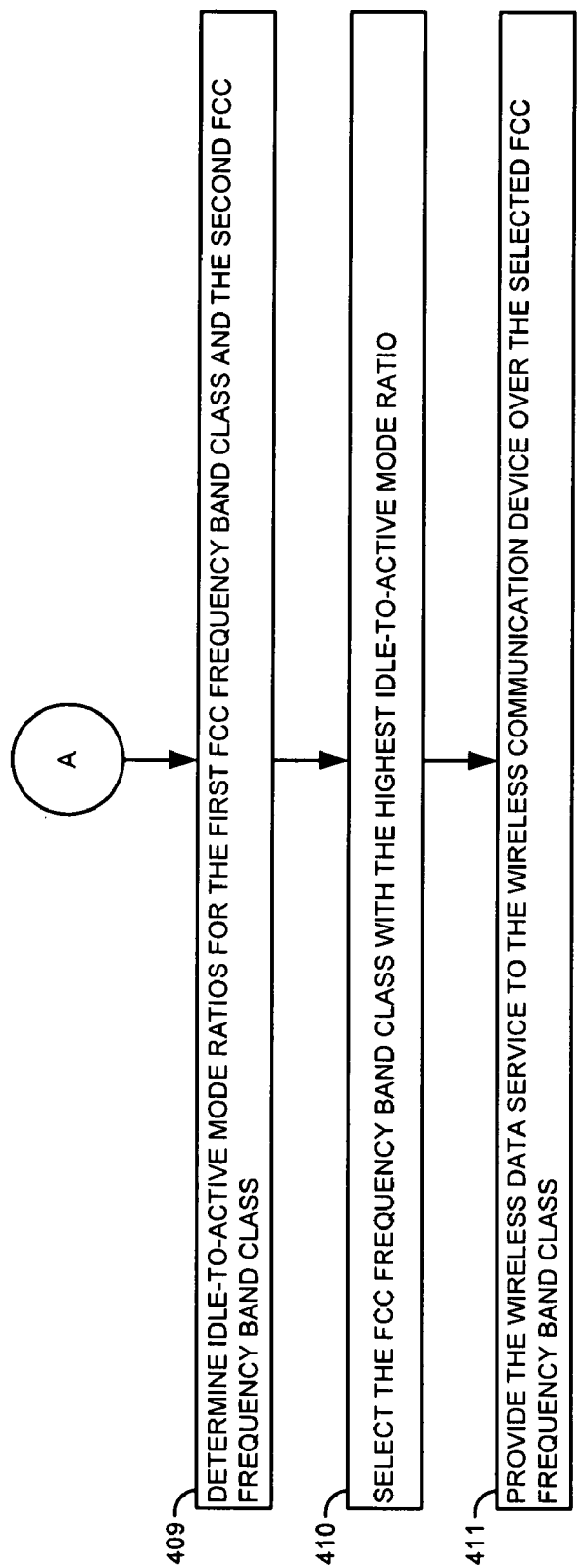
FIG. 5 illustrates the operation of the wireless communication system.

FIGS. 4-5 illustrate the operation of wireless communication system 300. Base stations 301-302 use filters 341 and 343 to provide a wireless data service to wireless communication devices 311, 313, and 316-317 over the first FCC band class (401). Base stations 301-302 use filters 342 and 344 to provide the wireless data service to wireless communication devices 312, 314, and 318-319 over the second FCC band class (401). Network gateway 303 monitors the number of active mode users and the number of idle mode users for the wireless data service over each of the FCC band classes (402). Network gateway 303 provides these active/idle mode numbers to node control system 304.

Wireless communication devices 311-312 and 316-318 are currently in active mode, and wireless communication devices 313-314 and 319 are currently in idle mode. In active mode, wireless communication devices 311-312 and 316-318 have continuously active signaling channels with base stations 301-302, and may use those channels to request or accept data communications. In idle mode, wireless communication devices 313-314 and 319 do not have continuously active signaling channels. In idle mode, wireless communication devices 313-314 and 319 stay dormant for a set period of time before activating temporary signaling channels to briefly exchange information while remaining in idle mode, and then they go dormant again for the set period of time. In idle mode, wireless communication devices 313-314 and 319 may also use the temporary signaling channels to request a transition to active mode.

Network gateway 303 receives a request for the wireless data service from wireless communication device 315 through base station 301 and responsively performs a service registration process (403). During the registration process, network gateway 303 determines the quality-of-service level for wireless communication device 315 and determines if wireless communication device 315 is capable of operating over either one of the FCC band classes. If wireless communication device 315 is not multi-class capable (404), then base station 301 would provide the wireless data service to wireless communication device 315 over the only FCC band class that device 315 can use. In this example however, wireless communication device 315 is multi-class capable.

Since wireless communication device 315 is multi-class capable (404), network gateway 303 requests a frequency band class selection for device 315 from node control system 304. This request includes the quality-of-service level for wireless communication device 315. If wireless communication device 315 does not have a high quality-of-service level (406), then node control system 304 would select an FCC band class for device 315 to allocate the wireless communication devices across the FCC band classes proportionate to band class capacity (407). For example, if the first band class has twice the capacity of the second band class, then the first band class should have twice as many users as the second band class. If the first band class has the same capacity as the second band class, then the first band class should have the same number of users as the second band class. Note that this approach should account for the devices that can use only one FCC band class, so the multi-class devices are assigned to achieve the desired distribution within each FCC band class. Network gateway 315 and base station 301 would then provide the wireless data service to wireless communication device 315 over the selected FCC band class (408). In this example however, wireless communication device 315 has a high quality-of-service.

Referring to FIG. 5, node control system 304 processes the number of active mode users and the number of idle mode users in each FCC band class to develop an idle-to-active mode user ratio for each band class (409). In this scenario, the ratio for the first FCC band class is 1/3 (device 313 is idle and devices 311 and 316-317 are active). The ratio for the second FCC band class is 2/2 (devices 314 and 319 are idle and devices 312 and 318 are active). Node control system 304 selects the FCC band class having the highest idle-to-active mode ratio—the band class having the higher percentage of idle mode users (410). Given the capacity-based load balancing for the other users, this selection of the band class having a higher percent of idle mode users should provide the high quality-of-service user with a better wireless data service.

Node control system 304 responds to network gateway 303 with the FCC band class selection for wireless communication device 315. Network gateway 303 transfers messages indicating the FCC band class selection to base station 301, wireless communication device 315, and other suitable network elements in wireless communication system 300. In response to the messages, base station 301 uses the appropriate one of filters 341-342 to provide the wireless data service to wireless communication device 315 over the selected FCC band class (411).

In the above example, node control system 304 determines FCC band class loading and performs band class selection across both base stations 301-302, but in other examples, the FCC band class loading and band class selection could be handled on an individual base station basis. In addition, there are two frequency band classes in the above examples, but additional band classes could be included.

Figure 6:
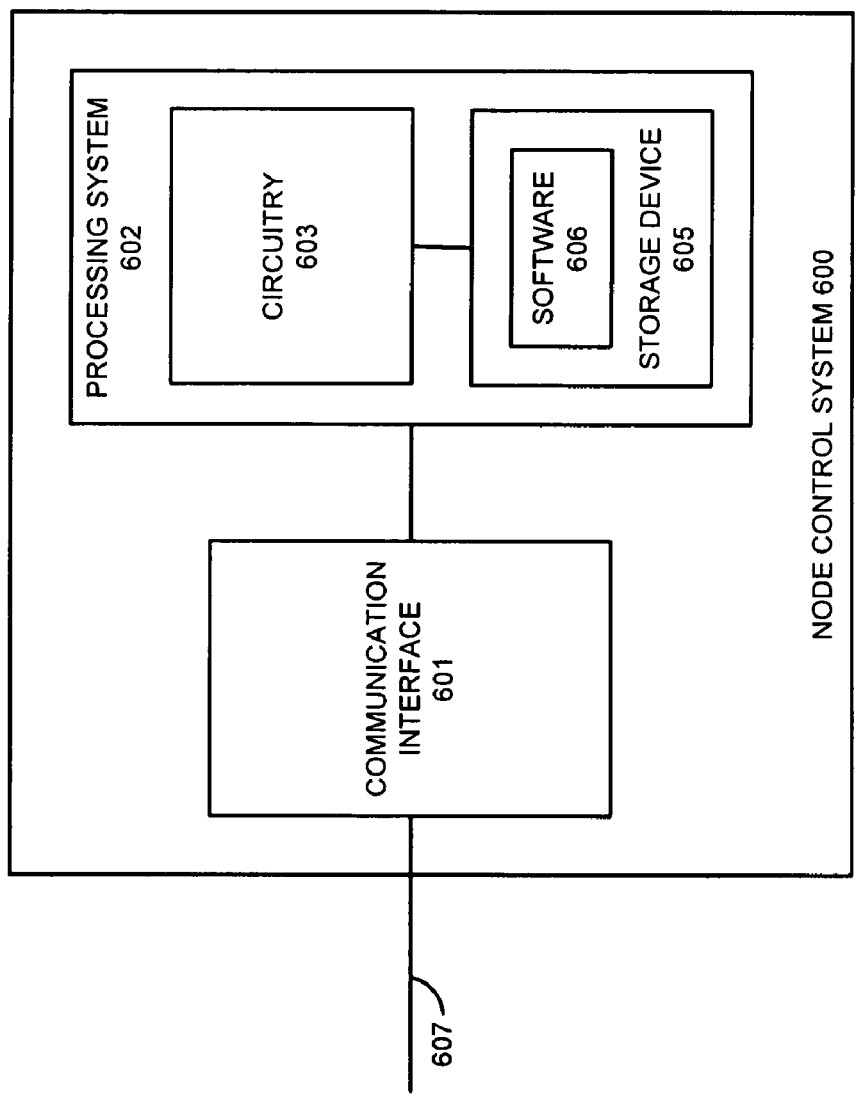
FIG. 6 illustrates a node control system.

FIG. 6 illustrates node control system 600. Node control system 600 provides on example of node control systems 102 and 304, although control systems 102 and 304 may use other configurations. Node control system 600 comprises communication interface 601 and processing system 602. Processing system 602 is linked to communication interface 601. Processing system 602 includes circuitry 603 and storage device 605 that stores operating software 606.

Communication interface 601 comprises components that transmit and receive communication signals over communication link 607 under the control of processing system 602. These components include transceiver and signal processing circuitry. The received communication signals include frequency band class loading information and wireless communication device quality-of-service information. The transmitted communication signals identify band class selections for the wireless communication devices.

Circuitry 603 comprises microprocessor and associated circuitry that retrieves and executes operating software 606 from storage device 605. Storage device 605 comprises a disk drive, flash drive, memory circuitry, or some other memory device. Operating software 606 comprises computer programs, firmware, or some other form of machine-readable processing instructions. Although storage device 605 is shown within node control system 600, a portion of storage device 605 could be externally located. For example, storage device 605 may comprise an external memory apparatus that stores software 606 for subsequent transfer to an internal disk drive within node control system 600.

When executed by circuitry 603, operating software 606 directs processing system 602 to operate node control system 600 as described herein for systems 102 and 304. In particular, operating software 606 directs processing system 602 to select frequency band classes for wireless communication devices based on band class loading.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
    providing a wireless communication service over a first frequency band class and providing the wireless communication service over a second frequency band class;
    monitoring a first communication load on the first frequency band class and monitoring a second communication load on the second frequency band class;
    receiving a request for the communication service from a wireless communication device, and in response, determining if the wireless communication device can receive the wireless communication service over either one of the first frequency band class and the second frequency band class;
    if the wireless communication device can receive the wireless communication service over either one of the first frequency band class and the second frequency band class, then selecting one of the first frequency band class and the second frequency band class for the wireless communication device based on the first communication load and the second communication load; and
    providing the wireless communication service to the wireless communication device over the selected one of the first frequency band class and the second frequency band class.

2. The method of claim 1 wherein monitoring the first communication load on the first frequency band class comprises monitoring a first amount of active mode users using the first frequency band class and monitoring the second communication load on the second frequency band class comprises monitoring a second amount of active mode users using the second frequency band class.

3. The method of claim 2 wherein selecting the one of the first frequency band class and the second frequency band class for the wireless communication device based on the first communication load and the second communication load comprises selecting the one of the first frequency band class and the second frequency band class for the wireless communication device based on the first amount of the active mode users using the first frequency band class and the second amount of the active mode users using the second frequency band class.

4. The method of claim 1 wherein monitoring the first communication load on the first frequency band class comprises monitoring a first amount of idle mode users using the first frequency band class and monitoring the second communication load on the second frequency band class comprises monitoring a second amount of idle mode users using the second frequency band class.

5. The method of claim 4 wherein selecting the one of the first frequency band class and the second frequency band class for the wireless communication device based on the first communication load and the second communication load comprises selecting the one of the first frequency band class and the second frequency band class for the wireless communication device based on the first amount of the idle mode users using the first frequency band class and the second amount of the idle mode users using the second frequency band class.

6. The method of claim 1 wherein providing the wireless communication service over the first frequency band class comprises using a first bandpass filter that passes a first frequency band, wherein providing the wireless communication service over the second frequency band class comprises using a second bandpass filter that passes a second frequency band, and wherein the first frequency band and the second frequency band are mutually exclusive.

7. The method of claim 1 wherein the first communication load on the first frequency band class comprises a first noise metric for the wireless communication service over the first frequency band class and the second communication load on the second frequency band class comprises a second noise metric for the wireless communication service over the second frequency band class.

8. The method of claim 1 wherein the first communication load on the first frequency band class comprises a first bandwidth metric for the wireless communication service over the first frequency band class and the second communication load on the second frequency band class comprises a second bandwidth metric for the wireless communication service over the second frequency band class.

9. The method of claim 1 wherein the first communication load on the first frequency band class comprises a first power metric for the wireless communication service over the first frequency band class and the second communication load on the second frequency band class comprises a second power metric for the wireless communication service over the second frequency band class.

10. The method of claim 1 wherein selecting the one of the first frequency band class and the second frequency band class for the wireless communication device further comprises selecting the one of the first frequency band class and the second frequency band class for the wireless communication device based on a quality-of-service level for the wireless communication device.

11. A wireless communication system comprising:
a wireless access node configured to provide a wireless communication service over a first frequency band class and over a second frequency band class, monitor a first communication load on the first frequency band class and a second communication load on the second frequency band class, receive a request for the communication service from a wireless communication device, and to provide the wireless communication service to the wireless communication device over a selected one of the first frequency band class and the second frequency band class; and
a node control system configured to determine if the wireless communication device can receive the wireless communication service over either one of the first frequency band class and the second frequency band class, and if the wireless communication device can receive the wireless communication service over either one of the first frequency band class and the second frequency band class, to select one of the first frequency band class and the second frequency band class for the wireless communication device based on the first communication load and the second communication load.

12. The wireless communication system of claim 11 wherein the first communication load comprises a first amount of active mode users using the first frequency band class and the second communication load comprises a second amount of active mode users using the second frequency band class.

13. The wireless communication system of claim 12 wherein the node control system is configured to select the one of the first frequency band class and the second frequency band class for the wireless communication device based on the first amount of the active mode users using the first frequency band class and the second amount of the active mode users using the second frequency band class.

14. The wireless communication system of claim 11 wherein the first communication load comprises a first amount of idle mode users using the first frequency band class and the second communication load comprises a second amount of idle mode users using the second frequency band class.

15. The wireless communication system of claim 14 wherein the node control system is configured to select the one of the first frequency band class and the second frequency band class for the wireless communication device based on the first amount of the idle mode users using the first frequency band class and the second amount of the idle mode users using the second frequency band class.

16. The wireless communication system of claim 11 wherein the wireless access node comprises a first bandpass filter and a second bandpass filter, wherein the first bandpass filter is configured to pass a first frequency band to enable the wireless communication service over the first frequency band class and the second bandpass filter is configured to pass a second frequency band to enable the wireless communication service over the second frequency band class, and wherein the first frequency band and the second frequency band are mutually exclusive.

17. The wireless communication system of claim 11 wherein the first communication load on the first frequency band class comprises a first noise metric for the wireless communication service over the first frequency band class and the second communication load on the second frequency band class comprises a second noise metric for the wireless communication service over the second frequency band class.

18. The wireless communication system of claim 11 wherein the first communication load on the first frequency band class comprises a first bandwidth metric for the wireless communication service over the first frequency band class and the second communication load on the second frequency band class comprises a second bandwidth metric for the wireless communication service over the second frequency band class.

19. The wireless communication system of claim 11 wherein the first communication load on the first frequency band class comprises a first power metric for the wireless communication service over the first frequency band class and the second communication load on the second frequency band class comprises a second power metric for the wireless communication service over the second frequency band class.

20. The wireless communication system of claim 11 wherein the node control system is configured to select the one of the first frequency band class and the second frequency band class for the wireless communication device based on a quality-of-service level for the wireless communication device.

* * * * *